Jan. 10, 1928.
W. J. MILLER
1,655,431
MECHANISM FOR PRODUCING INTERMITTENT ROTATION OF JIGGER SPINDLES
Filed Feb. 5, 1927
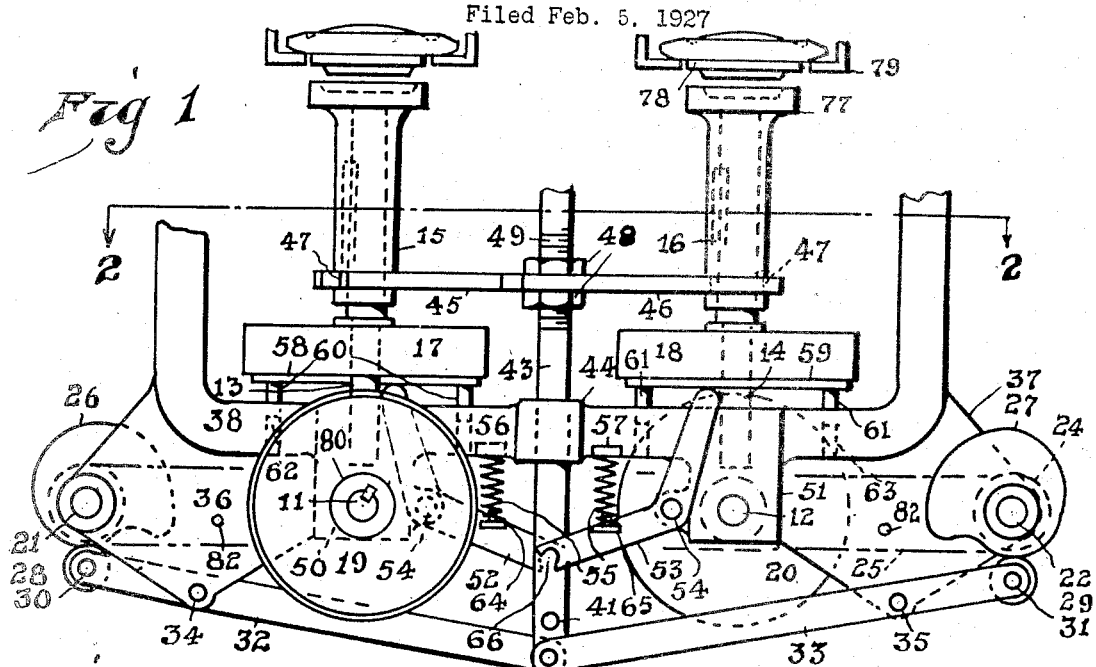
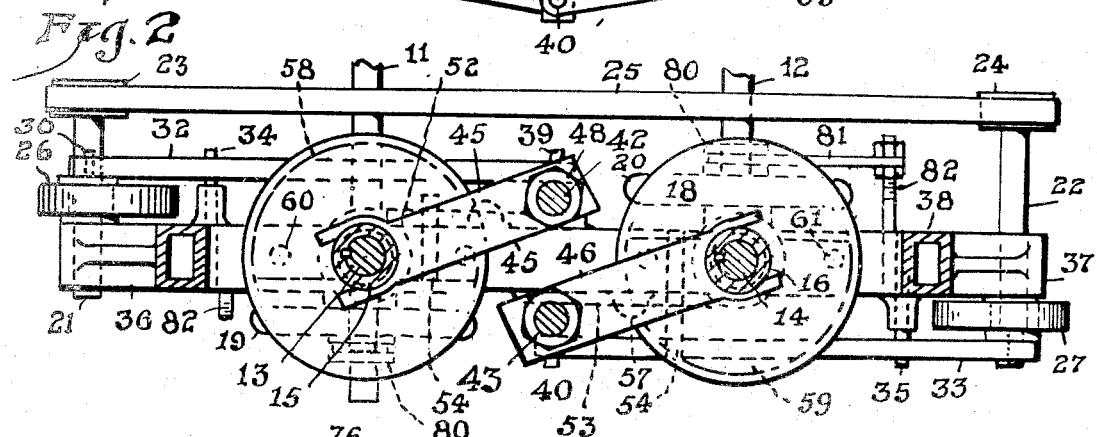
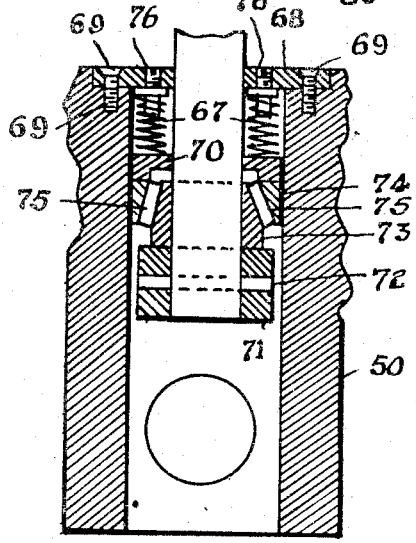
INVENTOR
William J. Miller
BY
Israel Benjamins
ATTORNEY Patented Jan. 10, 1928.

1,655,431

UNITED STATES PATENT OFFICE.

WILLIAM J. MILLER, OF SWISSVALE, PENNSYLVANIA.

MECHANISM FOR PRODUCING INTERMITTENT ROTATION OF JIGGER SPINDLES.

Application filed February 5, 1927. Serial No. 166,180.

My invention relates to improvements in the manufacture of articles from plastic materials, and particularly in the art of making pottery, and it consists in the novel features, which are hereinafter more fully described.

One of the objects of my improvements is to apply my mechanism for producing intermittent rotation of a jigger spindle in connection with reciprocating jiggers, in which molds are supported by carriers, from which they are raised by the chucks, which have no rotation with relation to said mold at the point of raising the latter,—to bring said molds into a state of rotation and into operative position with relation to suitable profiles, as described in my application for patent for jigger for use in the manufacture of articles from plastic materials, Ser. No. 143,994, filed Oct. 25, 1926; the molds are thereafter to be brought to a state of no rotation and to be deposited by said chucks on to the said carriers, after the material on said molds has been shaped by said profiles.

Another object of my improvement is—to provide a means for automatically producing and quickly discontinuing the rotation of said jigger spindles at the point when the molds are to be deposited by the chucks of said spindles into said carriers, thereby preventing wear on the molds.

Another object of my improvement is—to employ my mechanism for producing intermittent rotation of a jigger spindle in connection with reciprocating jiggers, similar to these described in my copending application for patent for multiple and automatic jiggers, Ser. No. 148,872, filed Nov. 17, 1926, and in some other of my copending applications for jiggers and kindred mechanisms.

A further object of my improvement is—to operate my mechanism for producing intermittent rotation of a jigger spindle in connection with jiggers arranged in duplicate, as is hereinafter described, thereby saving space, which arrangement may be in series as well as in parallel.

Another object of my improvement is—to have my mechanism for producing intermittent rotation of a jigger spindle simple durable and inexpensive.

Other objects and advantages will hereinafter appear.

I attain these objects by the mechanism, one form of which is illustrated in the accompanying drawings, or by any mechanical equivalent or obvious modification of the same.

In the drawings Fig. 1 is a fragmentary front elevation of my mechanism for producing intermittent rotation of a jigger spindle.

Fig. 2 is a plan view of the same on the line 2—2 of Fig. 1.

Fig. 3 is a vertical section of one of the anti-friction pivot bearings, which are employed with the vertical spindles of the horizontal friction gears, which are hereinafter described.

Similar numerals refer to similar parts throughout the several views.

11 and 12 designate two high speed horizontal shafts for actuating vertical spindles 13 and 14, which are in spline-sliding engagement with hollow jigger spindles 15 and 16, in which they are placed coaxially with the latter, and have secured thereto horizontally disposed friction gears 17 and 18, which are intermittently in contact with vertical continuous motion friction gears 19 and 20, which are in spline-sliding engagement with said shafts 11 and 12 for a purpose, which is hereinafter described.

Initially strained springs 67 are abutting at their upper ends against flanges, provided on screws 76 in stationary plates 68, which are secured to a pair of housings 50 and 51 at the upper ends of the latter, and are pressing at their lower ends against anti-friction thrust bearings, which are connected to the lower ends of said spindles 13 and 14, as hereinafter described, thereby producing a normal pressure at the line of contact of said horizontal gears 17 and 18 on said vertical gears 19 and 20, in addition to the force of gravity of said gears 17 and 18.

The said anti-friction thrust bearings, which are provided at the lower ends of said spindles 13 and 14, are enclosed by said cylindrical housings 50 and 51, which may be made in one with said frame 38, and they have journals in the lower ends thereof for said shafts 11 and 12, as shown in Figs. 1 and 3.

Each of said shafts 11 and 12 may be driven by an independent motor.

21 and 22 are two cam shafts, which have secured thereto pulleys or sprockets 23 and 24, which are operatively connected to each other by means of a belt or chain 25, which is in mesh with said pulleys or sprockets, and is shown in dot and dash lines in Fig. 1.

One of the shafts 21 or 22 may be driven by a motor, and the other of said shafts actuated by means of said chain 25.

Cams 26 and 27 are adjustably secured to said shafts 21 and 22 by means of suitable set screws, and they are in contact with rolls 28 and 29, which are pivotally connected by means of pins 30 and 31 to the outer ends of levers 32 and 33, which are oscillated by said cams 26 and 27, and are shown in Fig. 1 as pivoted at 34 and 35 on extensions 36 and 37 of a stationary frame 38.

Said extensions 36 and 37 have also therein journals for said cam shafts 21 and 22.

The inner ends of said levers 32 and 33 are pivotally connected to pitmen 42 and 43 by means of pins 39 and 40 and interchangeable openings 41 in said pitmen 42 and 43, which are slidably connected to said frame 38 by means of vertical sockets 44 thereon.

The openings 41 may also be employed for inserting thereinto pins, for engaging the inner ends of bell crank levers 52 and 53, which are hereinafter described, before said pins 39 and 40 would reach the same position, thereby producing an earlier release of brakes 58 and 59, which are hereinafter described.

Said pitmen 42 and 43 are connected by means of forked yokes 45 and 46 to said jigger spindles 15 and 16 respectively; the latter are provided with necks 47 thereon, to receive the forked ends of said yokes 45 and 46.

A pair of lock-nuts 48 on a threaded portion 49 on each of said pitmen 43 and 43 are provided for varying and adjusting the position of said yokes 45 and 46 with relation to said pitmen 42 and 43, thereby also varying and adjusting the position of said jigger spindles 15 and 16 with relation to stationary objects, for a purpose, which is described in my above copending application.

The said housings 50 and 51 are shown in Fig. 1 as having pivotally connected thereto bell crank levers 52 and 53 by means of pins 54.

Compression springs 55 are interposed between projections 64 and 65 on the horizontal arms of said bell crank levers 52 and 53 and the underside of extensions 56 and 57 on said frame 38, to press on said horizontal arms, thereby forcing the ends of said vertical arms of said levers 52 and 53 to bear against the underside of horizontally disposed plate brakes 58 and 59, which are positioned under said gears 17 and 18, thereby raising and pressing said plate brakes 58 and 59 against the underside of said gears 17 and 18, to lift the latter out of contact with said gears 19 and 20, and to prevent or discontinue rotation of the said gears 17 and 18 as is hereinafter described.

Pins 60 and 61 are provided at the underside of said plate brakes 58 and 59, integrally therewith or rigidly secured thereto, to slide in openings 62 and 63 in said frame 38, thereby guiding said brakes 58 and 59 vertically, when the latter are moving downwardly under the influence of gravity and the pressure of said gears 17 and 18 thereover after being released by the upper ends of said levers 52 and 53, as hereinafter described, and also when moving upwardly under the pressure of said upper ends of said levers 52 and 53 each time when the latter are reapplied thereto under the influence of said springs 55.

Suitable springs may be provided also for separating said plate brakes 58 and 59 from the underside of said gears 17 and 18 when the latter are lowered into contact with said gears 19 and 20, if desired.

The inner ends of the horizontal arms of said bell crank levers 52 and 53 have thereon hooks 66, as shown in Fig. 1, for being intercepted by said pins 39 and 40 on said pitmen 42 and 43, when the latter are moving upwardly under the influence of said levers 32 and 33, as is hereinbefore described, whereby said springs 55 are compressed, and the upper ends of the vertical arms of said levers 52 and 53 are withdrawn from the underside of said brakes 58 and 59, thereby releasing said gears 17 and 18 on said spindles 13 and 14; the latter with said gears 17 and 18 are then lowered by the action of gravity and springs 67, which are hereinafter described, into contact with said continuously moving gears 19 and 20, whereby rotary motion is imparted to said gears 17 and 18 and the said spindles 13 and 14.

The lower parts of said hooks 66 are provided, for being intercepted by said pins 39 and 40 during the downward motion of said pitmen 42 and 43, for cooperating with said springs 55 in turning said levers 52 and 53 with their vertical arms into engagement with said brakes 58 and 59.

The jigger spindles 15 and 16, when raised by said pitmen 42 and 43 are rotated by said spindles 13 and 14 by means of said spline-sliding engagement therewith, as hereinbefore described, whereby the molds 78, carried by the chucks 77, at the upper ends of said jigger spindles 15 and 16, may have each a charge of material thereon shaped by suitable profiles, as described in my above copending application.

The said anti-friction thrust bearings for the lower ends of said spindles 13 and 14 are shown in detail in Fig. 3 as containing each a cylindrical housing or shell 50 or 51, which is hollow and has thereon a cover plate 68, which may be secured thereto by means of screws 69.

Said compression springs 67 are interposed between flanges on said screws 76, in the underside of said plate 68, and a saddle 70, which is positioned thereunder; said screws 76 in said plate 68 extend into the upper ends of said springs 67, to keep the same in position; and the said flanges thereon afford a means for individually adjusting the tension of each spring; the saddle 70 and the plate 68 have therein circular openings, for one of said spindles 13 or 14 to extend therethrough; the lower end of said spindle 13 or 14 has thereon an annular collar 71, which is shown in Fig. 3 as secured thereto by means of a pin 72.

Annular members 73 and 74 are positioned coaxially with said spindle 13 or 14, to form therebetween a raceway for rollers 75, which are jammed in therebetween.

The member 73 is resting on said collar 71 and may slide thereon as well as with relation to said spindle 13 or 14, which passes therethrough.

The saddle 70 rides on said member 74 and transmits thereto the pressure of said springs 67, thereby causing said member 74 to bear on said rollers 75, which transmit the pressure to said member and collar 71, which, in turn, pulls on said spindle 13 or 14, thereby pressing said gear 17 or 18 against the gear 19 or 20 at the line of contact therebetween, as hereinbefore described.

The inclined position of the rollers 75 also causes the latter to take up the peripheral pressure of said spindle 13 or 14 due to the eccentricity of the brake pressure, which is applied thereto, and the reaction of said gears 19 and 20.

The friction gears 17 and 18 are raised by said brake-plates 58 and 59, when the latter are impelled by the upper ends of said levers 52 and 53, whereby said spindles 13 and 14 with the collars 71 thereon are also raised, against the pressure of said springs 67, which are initially strained, as hereinbefore described.

When the plates 58 and 59 are released by said upper ends of said levers 52 and 53, the friction gears 17 and 18 are quickly brought down by the pressure of said springs 67 on said saddle 70, as hereinbefore described, in addition to the force of gravity, which acts on said gears 17 and 18, whereby said gears 17 and 18 are brought into pressed contact with said gears 19 and 20, to be rotated by the latter when said jigger spindles 15 and 16 are raised into operative position by means of said pitmen 42 and 43 under the influence of said levers 32 and 33 and said cams 26 and 27, as hereinbefore described.

The speed of said horizontal gears 17 and 18 may be varied and adjusted by shifting the vertical gears 19 and 20 on the shafts 11 and 12 by means of sleeves 80, which may be made integral with said gears 19 and 20, and collars 81, which are swivelled on said sleeves 80 and are adjustably connected to said frame 38 by means of screws 82.

The time of raising of said gears 17 and 18 out of contact with said continuous motion gears 19 and 20 corresponds to the time of lowering of said jigger spindles 15 and 16, when the rotation of said gears 17 and 18 is stopped by said plates 58 and 59, as hereinbefore described, whereby the rotation of the chucks on said jigger spindles 15 and 16 with the molds 78 thereon may also be stopped at about the time when said molds are to be intercepted by the mold carriers 79, as described in my above copending application, thereby preventing undue wear of said molds 78 by said carriers 79.

By the above mechanism intermittent rotation of the jigger spindles is alternately produced and quickly stopped or arrested, without undue delay or interference with the operation of shaping the material on the molds 78, which are supported by the chucks 77 of said jigger spindles.

Many changes may be made in the details of my mechanism for producing intermittent rotation of a jigger spindle, without departing from the main scope of my invention, and parts of my invention may be used without other parts.

I do not, therefore, restrict myself to the details as shown in the drawings, but I intend to include also all mechanical equivalents and obvious modifications of the same within the scope of my invention.

I claim as my invention, and desire to secure by Letters Patent:

1. In a mechanism for producing intermittent rotation of a jigger spindle a continuous motion vertical friction gear, a horizontally disposed friction gear, in intermittent contact therewith, a means for alternately raising said horizontal gear out of contact with said vertical gear and lowering it into contact therewith, and a means for transmitting rotation from said horizontal gear to said spindle, thereby intermittently rotating the latter.

2. In a mechanism for producing intermittent rotation of a jigger spindle a continuous motion vertical friction gear, a horizontally disposed friction gear, in intermittent contact therewith, a means for alternately raising said horizontal gear out of contact with said vertical gear and lowering it into contact therewith, a spindle, for securing said horizontal gear thereto, and a means for transmitting rotation from said last mentioned spindle to said jigger spindle, thereby intermittently rotating the latter.

3. In a mechanism for producing intermittent rotation of a jigger spindle a continuous motion vertical friction gear, a horizontally disposed friction gear, in intermittent contact therewith, a spindle, for securing said horizontal gear thereto, in spline sliding engagement with said jigger-spindle and a means for alternately moving said gear spindle, with the horizontal gear thereon, into and out of contact with said vertical gear, thereby intermittently rotating said jigger spindle.

4. In a mechanism for producing intermittent rotation of a jigger spindle a continuous motion vertical friction gear, a horizontally disposed friction gear in intermittent contact therewith, a means for alternately raising said horizontal gear out of contact with said vertical gear and lowering it into contact therewith, a spindle, for securing said horizontal gear thereto, and a spline sliding engagement of said last mentioned spindle with said jigger spindle, thereby intermittently rotating the latter.

5. In a mechanism for producing intermittent rotation of a jigger spindle a continuous motion vertical friction gear, a horizontally disposed friction gear, in intermittent contact therewith, a hollow jigger spindle, a spindle, for securing thereto said horizontal gear, extending into said jigger spindle, a spline sliding engagement of said spindles therebetween and a means for intermittently moving said gear spindle, with the horizontal gear thereon, into and out of contact with said vertical gear, thereby intermittently rotating said jigger spindle.

6. In a mechanism for producing intermittent rotation of a jigger spindle a continuous motion vertical friction gear, a horizontally disposed friction gear in intermittent contact therewith, a means for alternately raising said horizontal gear out of contact with said vertical gear and lowering it into contact therewith, a hollow jigger spindle, a spindle, for securing said horizontal gear thereto, said last mentioned spindle extending into the interior of said jigger spindle, and a spline sliding engagement of said last mentioned spindle with said jigger spindle, thereby intermittently rotating the latter.

7. In a mechanism for producing intermittent rotation of a jigger spindle a continuous motion friction gear, another friction gear in intermittent contact therewith, a means for alternately bringing said last mentioned gear into and out of contact with said continuous motion gear, a reciprocating jigger spindle, a spindle, for securing said last mentioned gear thereto, a means, for transmitting rotation from said last mentioned spindle to said jigger spindle, and said transmitting means including a spline sliding engagement of two spindles.

8. In a mechanism for producing intermittent rotation of a jigger spindle a continuous motion vertical friction gear, a horizontally disposed friction gear in intermittent contact therewith, a means for alternately raising said horizontal gear out of contact with said vertical gear and lowering it into contact therewith, a means for transmitting rotation from said horizontal gear to said jigger spindle, thereby intermittently rotating the same, and a means for arresting the rotation of said horizontal gear after it has been raised out of contact with said vertical gear.

9. In a mechanism for producing intermittent rotation of a jigger spindle a continuous motion vertical friction gear, a horizontally disposed friction gear in intermittent contact therewith, a means for alternately raising said horizontal gear out of contact with said vertical gear and lowering it into contact therewith, a means for transmitting rotation from said horizontal gear to said jigger spindle, thereby intermittently rotating the same, and an automatic means, for arresting the rotation of said horizontal gear after it has been raised out of contact with said vertical gear.

10. In a mechanism for producing intermittent rotation of a jigger spindle a continuous motion vertical friction gear, a horizontally disposed friction gear, in intermittent contact therewith, a means for alternately raising said horizontal gear out of contact with said vertical gear and lowering it into contact therewith, a means for transmitting rotation from said horizontal gear to said jigger spindle, thereby intermittently rotating the same, a spring pressed brake, for arresting the rotation of said horizontal gear after it has been raised out of contact with said vertical gear, and a means for releasing said horizontal gear from said brake, before it is lowered into contact with said vertical gear.

11. In a mechanism for producing intermittent rotation of a jigger spindle a continuous motion vertical friction gear, a horizontally disposed friction gear, in intermittent contact therewith, a means for intermittently lowering said horizontal gear into contact with said vertical gear, a brake, positioned under said horizontal gear, a means for raising said brake, with said horizontal gear thereover, thereby both raising said horizontal gear out of contact with said vertical gear and arresting the rotation of said horizontal gear, after it has been raised out of contact with said vertical gear, and a means for transmitting rotation from said horizontal gear to said jigger spindle, thereby intermittently rotating the same.

12. In a mechanism for producing intermittent rotation of a jigger spindle a continuous motion vertical friction gear, a horizontally disposed friction gear, in intermittent contact therewith, a means for intermittently lowering said horizontal gear into contact with said vertical gear, a brake, positioned under said horizontal gear, a spring pressed lever, for raising said brake with said horizontal gear thereover, thereby both raising said horizontal gear out of contact with said vertical gear and arresting the rotation of said horizontal gear, after it has been raised out of contact with said vertical gear, and a means for transmitting rotation from said horizontal gear to said jigger spindle, thereby intermittently rotating the same.

13. In a mechanism for producing intermittent rotation of a reciprocating jigger spindle a continuous motion vertical friction gear, a horizontally disposed friction gear, in intermittent contact therewith, a means for intermittently lowering said horizontal gear into contact with said vertical gear, a brake, positioned under said horizontal gear, a frame, a spring pressed bell-crank lever, pivotally connected thereto, a substantially vertical arm thereon, for intermittently raising said brake with said horizontal gear thereover, thereby both raising said horizontal gear out of contact with said vertical gear and arresting the rotation of said horizontal gear, after it has been raised out of contact with said vertical gear, a reciprocating part connected to said jigger spindle, a means for intermittently engaging said part to the horizontal arm of said lever, for intermittently releasing said brake, thereby releasing said horizontal gear, when said jigger spindle is moving into operative position, and a means for transmitting rotation from said horizontal gear to said jigger spindle, thereby intermittently rotating the same.

14. In a mechanism for producing intermittent rotation of a jigger spindle a continuous motion vertical friction gear, a horizontal friction gear, in intermittent contact therewith, a means for moving said horizontal gear into contact with said vertical gear, and for pressing said horizontal gear against said vertical gear when in contact therewith, a means, for moving said horizontal gear out of contact with said vertical gear in opposition to the force of said pressing means, and a means for transmitting rotation from said horizontal gear to said jigger spindle, thereby intermittently rotating the latter.

15. In a mechanism for producing intermittent rotation of a jigger spindle a continuous motion vertical friction gear, a horizontal friction gear in intermittent contact therewith, an elastic means, for moving said horizontal gear into contact with said vertical gear and for pressing said horizontal gear against said vertical gear, when in contact therewith, a means, for moving said horizontal gear out of contact with said vertical gear in opposition to the force of said elastic means, and a means for transmitting rotation from said horizontal gear to said jigger spindle, thereby intermittently rotating the latter.

16. In a mechanism for producing intermittent rotation of a jigger spindle a continuous motion vertical friction gear, a horizontal friction gear, in intermittent contact therewith, a spring for moving said horizontal gear into contact with said vertical gear and for pressing said horizontal gear against said vertical gear, when in contact therewith, a means for moving said horizontal gear out of contact with said vertical gear, in opposition to the force of said spring, and a means for transmitting rotation from said horizontal gear to said jigger spindle, thereby intermittently rotating the latter.

17. In a mechanism for producing intermittent rotation of a jigger spindle a continuous motion vertical friction gear, a horizontal friction gear, in intermittent contact therewith, a spindle, for securing said horizontal gear thereto, a stationary part, a spring, for reacting at one end thereof on said part and at the other end thereof on said spindle, to move said horizontal gear into contact with said vertical gear and for pressing said horizontal gear against said vertical gear when in contact therewith, a means for moving said horizontal gear out of contact with said vertical gear in opposition to the force of said spring, and a means for transmitting rotation from said horizontal gear to said jigger spindle, thereby intermittently rotating the latter.

18. In a mechanism for producing intermittent rotation of a jigger spindle a continuous motion vertical friction gear, a horizontal friction gear, in intermittent contact therewith, a spindle, for securing said horizontal gear thereto, a stationary part, an anti-friction thrust bearing on said spindle, a compression spring, abutting at one end thereof against said part and at the other end thereof against said bearing, for keeping said bearing under pressure and for reacting on said spindle, to move said horizontal gear into contact with said vertical gear and to press said horizontal gear against said vertical gear when in contact therewith, a means for moving said horizontal gear out of contact with said vertical gear in opposition to the force of said spring, and a means for transmitting rotation from said horizontal gear to said jigger spindle, thereby intermittently rotating the latter.

19. In a mechanism for producing intermittent rotation of a jigger spindle a continuous motion vertical friction gear, a horizontally disposed friction gear, in intermittent contact therewith, a spindle, for securing said horizontal gear thereto, a means for slidably connecting said gear spindle to said jigger spindle, to rotate therewith, and slide lengthwise thereof, with relation to said jigger spindle, a means for alternately moving said gear spindle with said horizontal gear thereon into and out of contact with said vertical gear, thereby intermittently rotating said jigger spindle.

20. In a mechanism for producing intermittent rotation of jigger spindles a pair of continuous motion vertical friction gears, a pair of horizontally disposed friction gears, in intermittent contact therewith, a pair of spindles, for securing said horizontal gears thereto, a means for alternately moving said gear spindles, with said horizontal gears thereon, into and out of contact with said vertical gears, thereby intermittently rotating said jigger spindles, and said gears with said spindles being arranged substantially as shown in the drawings, thereby saving space.

WILLIAM J. MILLER.